US009619306B2

(12) United States Patent
Mori (10) Patent No.: US 9,619,306 B2
(45) Date of Patent: Apr. 11, 2017

(54) INFORMATION PROCESSING DEVICE, CONTROL METHOD THEREOF, AND RECORDING MEDIUM (71) Applicant: CANON KABUSHIKI KAISHA, Tokyo (JP)

(72) Inventor: Namihiro Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/063,795

(22) Filed: Mar. 8, 2016

(65) Prior Publication Data
US 2016/0274957 A1    Sep. 22, 2016

(30) Foreign Application Priority Data
Mar. 17, 2015   (JP) .................. 2015-053658

(51) Int. Cl.
G06F 13/00    (2006.01)
G06F 9/54     (2006.01)
G06F 11/07    (2006.01)

(52) U.S. Cl.
CPC .............. *G06F 9/542* (2013.01); *G06F 9/546* (2013.01); *G06F 11/0706* (2013.01); *G06F 11/0778* (2013.01)

(58) Field of Classification Search
CPC .................................................. G06F 9/542
USPC ....................................................... 719/318
See application file for complete search history.

(56) References Cited

U.S. PATENT DOCUMENTS 5,526,485 A    6/1996 Brodsky ............... 395/183.14
6,594,774 B1   7/2003 Chapman et al. ............. 714/2
8,074,116 B2 * 12/2011 Pardoe ............... G06F 11/0778
                                                    712/244
8,504,923 B2 *  8/2013 Lacey ...................... G06F 8/38
                                                    709/204
2014/0109111 A1 * 4/2014 Gupta ................ G06F 11/0766
                                                    719/318
2016/0232347 A1 * 8/2016 Badishi .................... G06F 21/56

FOREIGN PATENT DOCUMENTS

JP    7-334377 A    12/1995

OTHER PUBLICATIONS

Search Report issued by the EPO on Aug. 24, 2016, in Application No. EP 16159198.7, which is a foreign counterpart of the present application.

* cited by examiner

*Primary Examiner* — Andy Ho
(74) *Attorney, Agent, or Firm* — Fitzpatrick, Cella, Harper & Scinto (57) ABSTRACT An information processing device can execute a program composed of a plurality of modules including a self-module that is under the management of a module management unit and the other module that is not under the management. The module management unit 7 performs registration of a function to be notified of by a signal when an exception occurs in a program. When the signal is received if an exception occurs, exception processing is executed. At the time of loading a certain module in a process, if a function of the other module is already registered, the module management unit stores information of the function, and performs function registration to execute the exception processing with a function of the self-module instead. The same signal as the signal that the registered function receives is transmitted to the stored function of the other module.

19 Claims, 10 Drawing Sheets

| Function ID | Function pointer |
|---|---|
| 001 | 0x40e7fe |
| 002 | 0x47c93c |
| 003 | 0x43b83a |

FIG. 11

INFORMATION PROCESSING DEVICE, CONTROL METHOD THEREOF, AND RECORDING MEDIUM

BACKGROUND OF THE INVENTION

Field of the Invention

The present invention relates to a technology for exception processing at the time of a termination of a process of an information processing device.

Description of the Related Art

There are cases in a program executed by an information processing device in which an unexpected exception occurs due to an input of a value departing from a predetermined range, access violation of a memory, or the like. For example, there is a case in which data retained in a memory is lost when a process is abnormally terminated at the end during execution of a program. Data that has not been saved during an operation, such as log information or registry information, can vanish. As a countermeasure thereto, using a mechanism provided by an operation system (hereinafter, will also be referred to as an OS), an exception can be detected before a process is abnormally terminated and dump information of the process can be acquired. This is an effective measure for a programmer to investigate the cause of the exception and modify a program.

As an exception processing method used for an abnormal termination of a process in the related art, there is a method in which, when a certain module is loaded, a function that defines processing that is desired to be executed when an exception occurs is registered in an OS. The OS sends a signal to the registered function when the process detects an abnormality. For example, by registering a function that defines dump information acquisition processing in the OS, the dump information can be acquired. As a registration method performed when a signal is to be received when exception processing becomes necessary and thus the exception processing is to be executed, there is the method disclosed in Japanese Patent Laid-Open No. 7-334377. This method enables a burden of a programmer required for signal setting to be eased and exception processing to be surely and easily performed as intended. When control is transferred from one module to another module, a process of evacuating registered content of the exception processing and restoring the information that has been evacuated when control returns is performed.

In the technology disclosed in Japanese Patent Laid-Open No. 7-334377, there is no mention about calling control of a function when a signal is received and exception processing is executed. For example, exception processing performed when a program includes a module developed by a person other than a creator thereof (hereinafter, will also be referred to as the other module) is assumed. A general program is composed of a plurality of modules. As the scale of a program becomes larger, a larger number of persons or a larger number of groups are involved therein and thus there are few cases in which a single programmer or team implements all modules. With regard to the other module, there is a case of a program configured in conjunction with such a module that cannot be controlled because only a part of an interface thereof is disclosed, but the remaining part thereof is not disclosed. For this reason, when a function of a module that is not under control is called first at the time of exception processing, there can be a case in which a signal is not transmitted to a module that has been developed by the creator of the program due to the control of the module. In such a case, there is a possibility of dump information of only some modules being acquired.

SUMMARY OF THE INVENTION

The present invention provides an information processing device and a control method thereof, which can execute exception processing of a module that is loaded in a process being executed when an exception occurs, and a recording medium.

A device according to the present invention has a registration unit configured to register a function of a module as a signal notification function that receives a signal if an exception occurs in a program, and a determination unit configured to determine whether a function is already registered as the signal notification function. If the registration unit registers a function of a first module as the signal notification function, the determination unit determines whether a function of a second module is already registered as the signal notification function, and if the determination unit determines that the function of the second module is already registered as the signal notification function, the registration unit registers a function for calling the function of the first module and the function of the second module as the signal notification function.

Further features of the present invention will become apparent from the following description of exemplary embodiments with reference to the attached drawings.

DESCRIPTION OF THE EMBODIMENTS

Each of embodiments of the present invention will be described below using the drawings. After matters that are common in each of the embodiments are described with reference to FIGS. 1 to 4, details thereof will be described.

Figure 1:
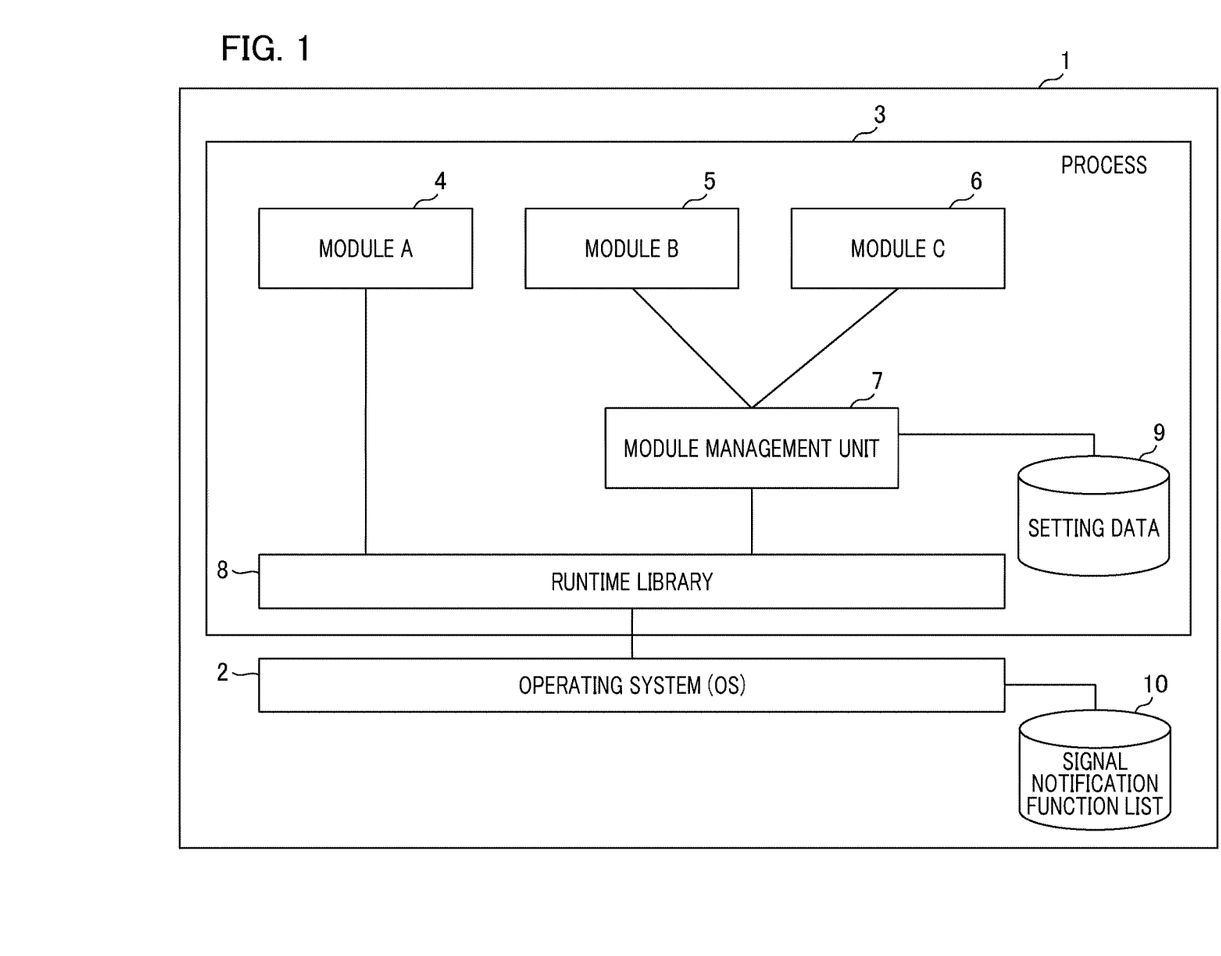
FIG. 1 is a block diagram showing a configuration example of an information processing device in an embodiment of the present invention.

FIG. 1 is a block diagram showing a system configuration example of an information processing device 1 in an embodiment of the present invention. The information processing device 1 is an execution device for executing various types of programs, and a plurality of processes 3 are run on an operating system (OS) 2 thereof. The OS 2 is a basic software group that manages hardware and resources, and typical examples thereof include Microsoft Windows, Linux, and the like. Each process 3 is a unit of an execution program, and is assumed to be composed of, for example, a plurality of modules 4 to 6, a module management unit 7, and a runtime library 8. The modules 4 to 6 shown in FIG. 1 indicate modules A to C. Each of the modules represents a unit of an execution program that is smaller than the process 3.

In the present embodiment, there are two types of modules which are a "self-module" and the "other module". The "self-module" is a first type module representing a module that the module management unit 7 can manage. Whereas, the "other module" is a second type module representing a module that is outside of the management of the module management unit 7. The "other module" includes a module developed by a person other than a creator of a program. As exemplified in FIG. 1, the module A is the other module, which performs direct transmission and reception of information with the runtime library 8. Whereas, the module B and the module C are self-modules, which perform transmission and reception of information with the module management unit 7.

The module management unit 7 has a function of managing the self-modules. Managing mentioned here mainly refers to registering a function to be called at the time of exception processing of each module in the OS 2, or executing exception processing of each module when an abnormality is detected in the process 3. In addition, the module management unit 7 manages setting data 9. Details of the setting data 9 as setting information that the module management unit 7 manages will be described below using FIG. 3.

The runtime library 8 is a module in which functions shared by a plurality of programs are compiled, and is an essential library in executing the programs. The runtime library 8 is conjunctively used when a developed program is executed, and exchanges information with the OS 2.

Figure 2:
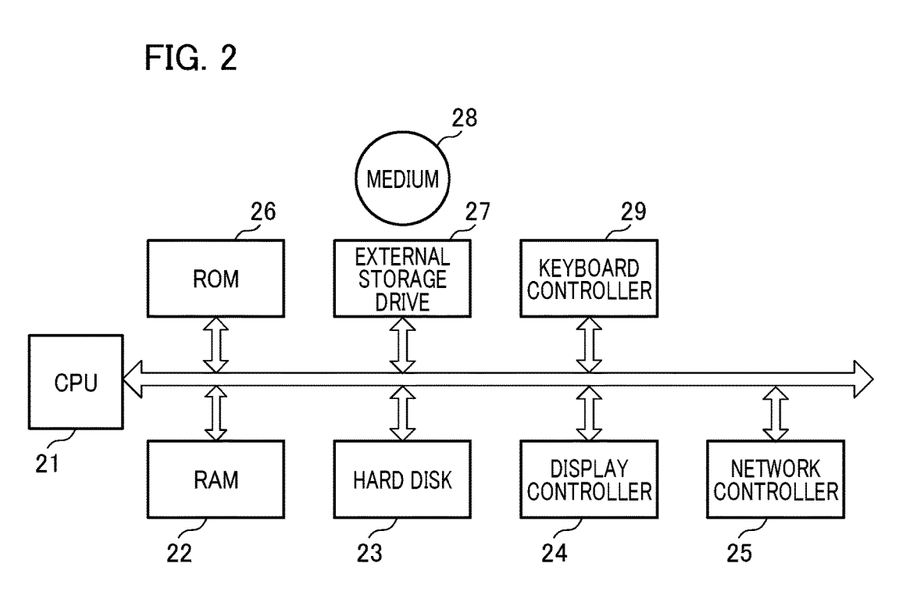
FIG. 2 is a block diagram showing an example of a hardware configuration of the information processing device.

FIG. 2 is a block diagram showing an example of a hardware configuration of the information processing device 1. A central processing unit (CPU) 21 reads, interprets, and executes a predetermined program. The CPU performs a process of executing a program stored in a program area inside a read only memory (ROM) 26, the OS 2 loaded from a hard disk 23 into a random access memory (RAM) 22, and a program such as a generic application. The RAM 22 is a storage device that functions as a main memory of the CPU 21, a work area, and the like. The hard disk 23 is a storage medium which stores a boot program, various applications, font data, user files, electronic document files, and the like. A program relating to the present embodiment is stored in the hard disk 23, read by the RAM 22, and executed by the CPU 21.

A display controller 24 performs display control of a display (display unit). A network controller 25 performs control of communication processing with devices connected on networks. An external storage drive 27 controls reading and writing of data with respect to a medium (recording medium) 28. A keyboard controller 29 performs input processing of operation instructing signals according to key operations, operations of a pointing device of a user, and the like.

Figure 3:
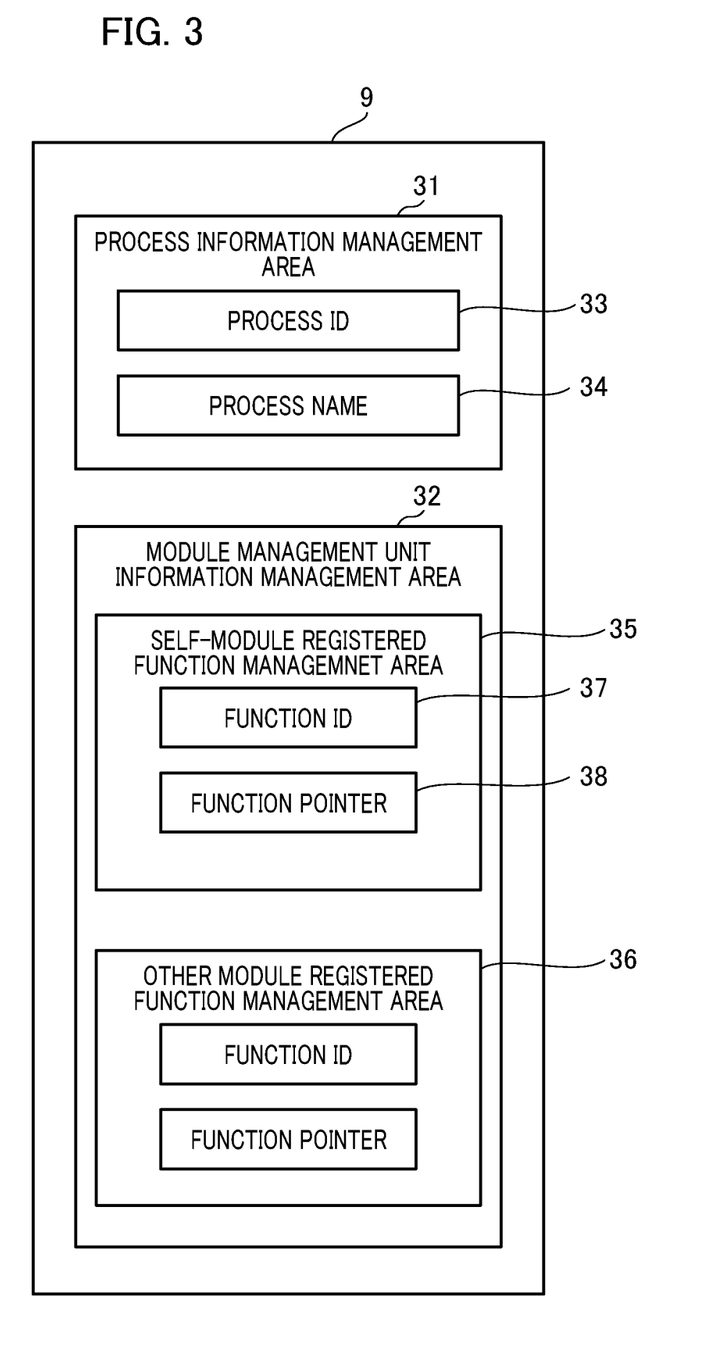
FIG. 3 is a diagram showing a structural example of setting data that a module management unit manages.

FIG. 3 is a conceptual diagram showing a structural example of the setting data 9 that the module management unit 7 manages. The setting data 9 is as a data structure referenced and updated by the module management unit 7 during the execution of registration processing of a function that is to be called at the time of exception processing or during the execution of the exception processing. Each process has one set of setting data 9. A storage area of the setting data 9 is not particularly limited as long as it has the function of storing data, such as a file, a memory, or a database. The setting data 9 has, for example, first and second management areas. The first management area 31 is a process information management area, and the second management area 32 is a module management unit information management area.

The first management area 31 is an area for managing information regarding the process 3 being run due to the execution of the program. Each process run in the information processing device 1 is assigned a process ID 33 and a process name 34. The first management area 31 stores these two types of information. The module management unit 7 can specify in what process the unit is being operated with reference to the process ID 33 and the process name 34.

The second management area 32 is an area for managing information regarding the module management unit 7 being run in the process 3, and stores information regarding a function that is to be called when exception processing is performed. The second management area 32 has a plurality of registered function management areas. For example, the second management area 32 has two areas which are a self-module registered function management area (hereinafter, referred to as a self-function management area) 35 and the other module registered function management area (hereinafter, referred to as the other function management area) 36.

The self-function management area 35 is an area in which information of a function to be called at the time of exception processing requested from a self-module, i.e., a module that is under management of the module management unit 7, is stored. On the other hand, the other function management area 36 is an area in which information of a function to be called at the time of exception processing that the other module, i.e., the module that is not under management of the module management unit 7, has registered in the OS 2 is stored. In each of the areas, a function ID 37 and a function pointer 38 are stored. The function ID 37 represents an identifier given by the OS 2 for uniquely identifying a registered function. The function pointer 38 represents the head address of a memory in which the registered function is loaded. When exception processing occurs, processing of calling a function is performed with reference to stored information of the self-function management area 35 and the other function management area 36.

Figure 4:
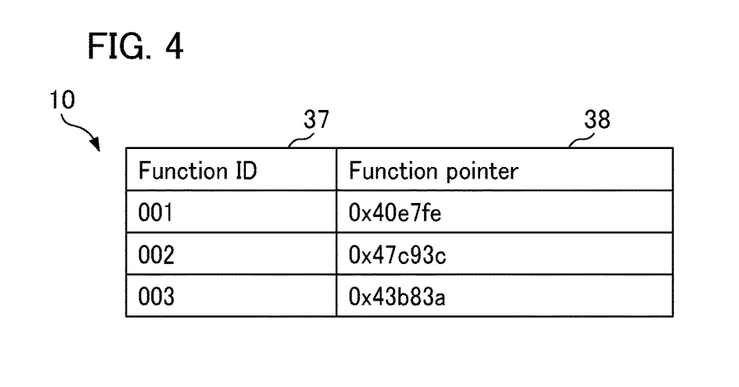
FIG. 4 is a diagram showing a structural example of a signal notification function list that an OS manages.

FIG. 4 shows a structural example of a signal notification function list 10 that the OS 2 manages. The signal notification function list 10 is data for managing a list of functions to which a signal is transmitted when an exception occurs, and one set of data thereof is set in each process. A storage area of the signal notification function list 10 is not particularly limited as long as it has a function of storing data, such as a file, a memory, or a database. Registration or updating of the signal notification function list 10 is possible through communication between each module or the module management unit 7 included in the process 3 and the OS 2 via the runtime library 8. Two types of information including the function ID 37 and the function pointer 38 are mainly managed on the signal notification function list 10. In the example shown in FIG. 4, a total of three functions are registered. When exception processing occurs, the functions from the top of the list are sequentially executed. In other words, the first function whose function ID 37 is "001" is first called in this case. It is configured so that, when the execution of the function is completed, the second function whose function ID 37 is "002" is called in the next control, and then the third function is called.

(First Embodiment)

A first embodiment of the present invention will be described below. An example of a series of processing performed by the module management unit 7 will be described with reference to the flow chart shown in FIG. 5. A case in which the three modules A, B, and C are loaded and executed in the process 3 as shown in FIG. 1 in the embodiment will be described. The order in which the modules are loaded is assumed to be the order of the module A that is the other module, the module B that is a self-module, and the module C that is a self-module below. Furthermore, it is assumed that a function A, a function B, and a function C are defined by the module A, the module B, and the module C respectively and these functions define processing (for example, dump information acquisition processing) to be performed when an exception occurs. In addition, a function D is defined by the module management unit 7, and processing of sequentially calling the registered functions of the self-modules to be called when an exception occurs is executed.

Figure 5:
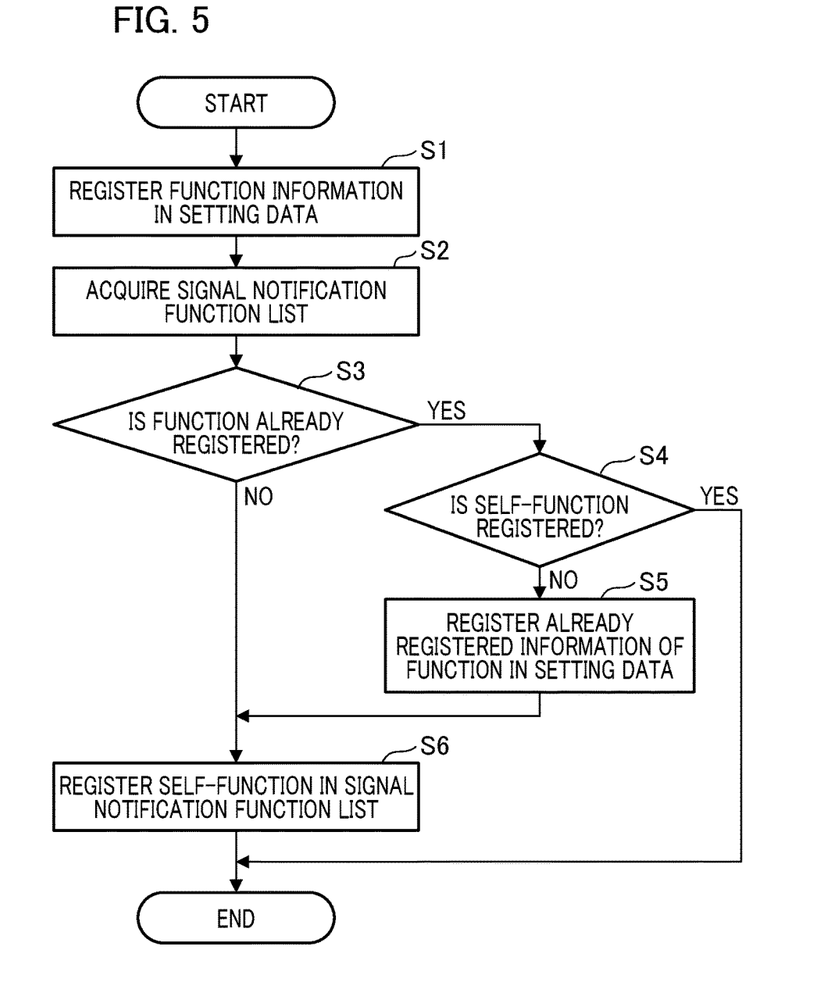
FIG. 5 is a flow chart showing an example of processing performed by a module management unit when a module is loaded in a first embodiment.

In FIG. 5, when a certain module is loaded and the module management unit 7 is started, the module management unit proceeds to S1. The module management unit 7 receives a request from the module to register a function to be called when an exception occurs in S1. At this time, the module management unit 7 creates a new instance of the setting data 9, and registers information of the received function (function information) in the setting data 9. At that time, the module from which the module management unit 7 received the registration request is assumed to be under management of the module management unit 7. In other words, the module is a self-module, and the module management unit 7 that has received the request to register the function information performs registration in the self-function management area 35.

Next, the module management unit 7 acquires the signal notification function list 10 from the OS 2 via the runtime library 8 in S2. Then, in S3, the module management unit 7 determines whether the function is already registered in the signal notification function list 10 acquired in S2. If the function is already registered in the signal notification function list 10, the module management unit proceeds to the processing of S4, and if the function is not registered, the module management unit moves to S6.

In S4, the module management unit 7 determines whether the function registered in the signal notification function list 10 is its own function (function under its management). If the function to be determined is not its own function, the module management unit 7 proceeds to S5, registers function information that is already registered in the setting data 9, and proceeds to S6. At this time, the function that is already registered in the signal notification function list 10 is the function of the other module that is not under management of the module management unit 7. For this reason, the module management unit 7 performs registration in the other function management area 36. On the other hand, if the module management unit 7 determines that the function to be determined is its own function in S4, it is not necessary to register the function again. Thus, the processing ends with no particular operation.

In S6, the module management unit 7 registers its own function in the signal notification function list 10. In the case of a function of which registration is requested from a self-module, the content of the function is on a list of functions stored in the self-function management area 35 in the setting data 9. In this case, if its own function is called, functions registered in the list of functions are sequentially called and executed by the CPU 21.

As described above, the module management unit 7 acquires the signal notification function list 10 registered in the OS each time a module is loaded in the process 3. If there is a registered function other than its own functions, the module management unit 7 stores information of the list of functions in a storage section, and registers information of its own functions instead. Accordingly, when an exception occurs in the process 3, a function defined by the module management unit 7 is surely called.

Figure 6A:
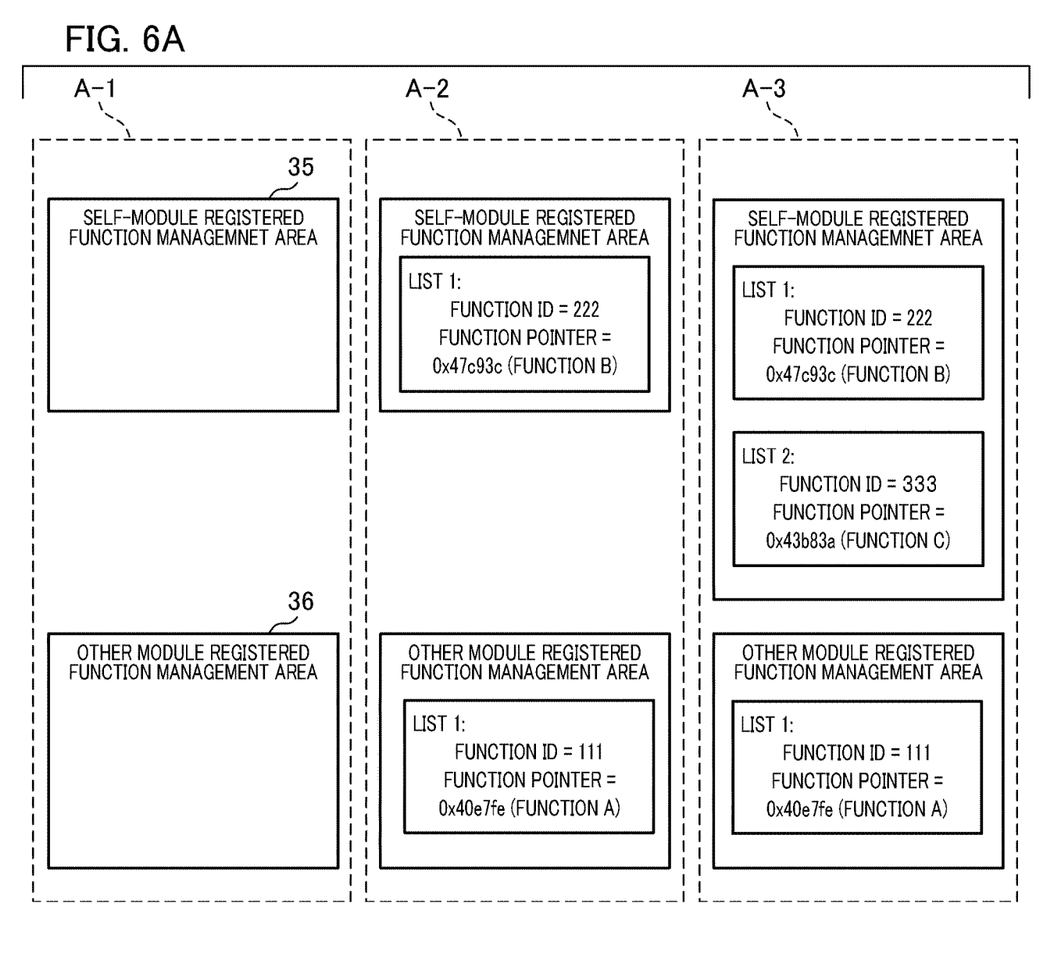
FIG. 6A and FIG. 6B are diagrams showing an example of data transition when modules are loaded in the first embodiment.
Figure 6B:
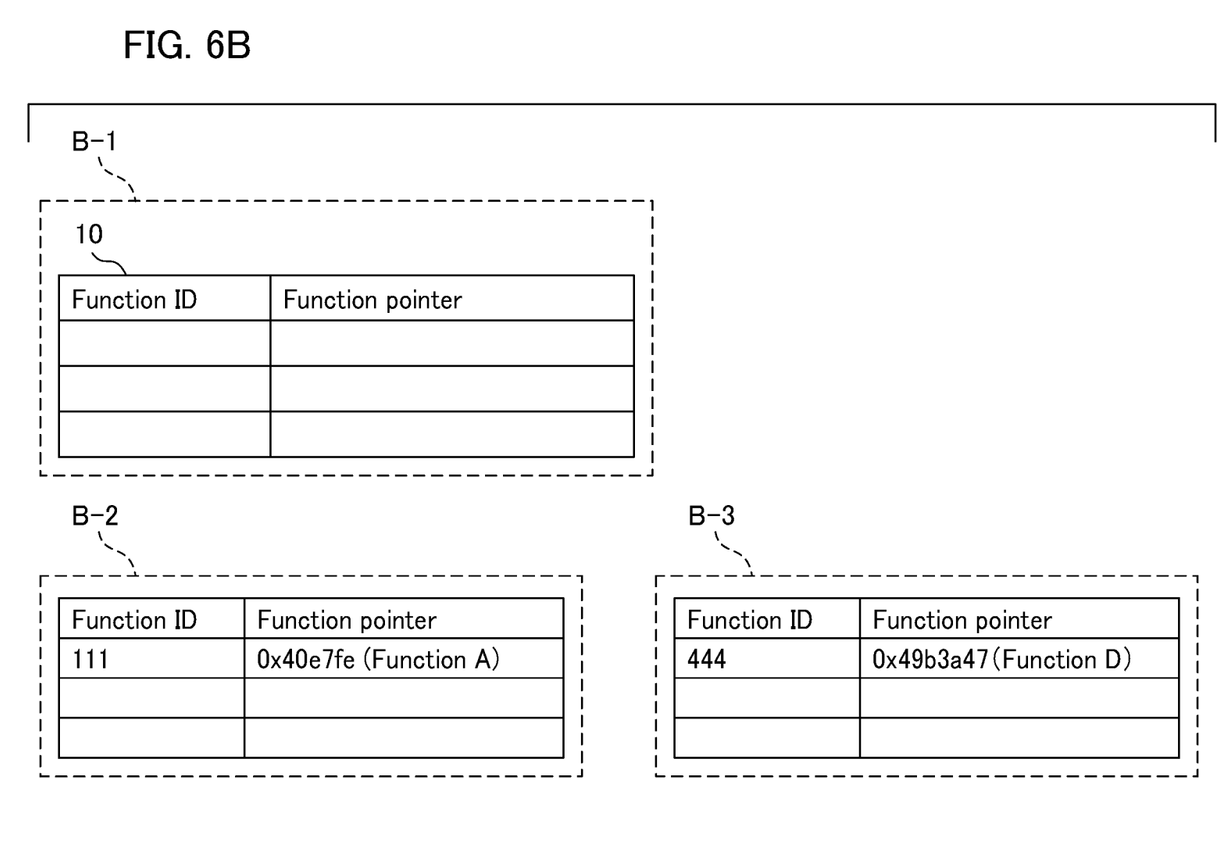

An operation will be described in detail below with reference to FIGS. 6A and 6B. FIGS. 6A and 6B show an example of data transition of the setting data 9 and the signal notification function list 10 when modules are loaded in the present embodiment. FIG. 6A exemplifies data transition with respect to the second management area 32 in the setting data 9. As indicated by reference numeral A-1, there is no data in both the self-function management area 35 and the other function management area 36 in an initial state. In addition, FIG. 6B exemplifies data transition of the signal notification function list 10. As indicated by reference numeral B-1, there is no registered information on the list of functions in the initial state.

The module A is assumed to be loaded first. The module A is the other module and is not involved with the module management unit 7, and thus no change occurs in data in the second management area 32. The module B is assumed to be loaded next. Since the module B is a self-module, a request for registering the function B is made to the module management unit 7. Accordingly, the module management unit 7 stores information of the function B in the self-function management area 35 of the setting data 9 in S1 of FIG. 5. Then, the module management unit 7 acquires the signal notification function list 10 in S2 of FIG. 5. As a result, the function A of the other module A is registered as indicated by reference numeral B-2, and thus the module management unit proceeds to S4 from S3 of FIG. 5. After proceeding from S4 to S5, the module management unit 7 stores information of the function A in the other function management area 36 as indicated by reference numeral A-2. In S6 of FIG. 5, the module management unit 7 registers its own function D in the signal notification function list 10.

The module C is assumed to be loaded, finally. The module C is a self-module and a request for registering the function C is made to the module management unit 7 as in the case of the module B. Accordingly, the module management unit 7 stores information of the function C in the self-function management area 35 in the setting data 9 in S1 of FIG. 5 as indicated by reference numeral A-3. In addition, although processing of acquiring the signal notification function list 10 is performed in S2 of FIG. 5 as when the module B is loaded, the function D of the module management unit 7 is already registered therein as indicated by reference numeral B-3. Thus, the information of the other function management area 36 is not updated as indicated by reference numeral A-3.

Referring to FIG. 6B, the initial state of reference numeral B-1 that is a state in which no function is registered on the list transitions to the state of reference numeral B-2 when the module A is loaded. This is because the module A is the other module and thus is registered in the signal notification function list 10 without being involved with the module management unit 7. Consequently, the information of the function A is registered in the signal notification function list 10.

Next, when the module B is loaded, the module management unit 7 updates the information of the signal notification function list 10 in S6 of FIG. 5. Thus, the function D of the module management unit 7 is registered in the signal notification function list 10 as indicated by reference numeral B-3. When the module C is finally loaded, the module management unit 7 references the information of the signal notification function list 10 as when the module B is loaded, however, the registered function was registered by the module management unit 7 itself. Thus, the signal notification function list 10 is not updated, and the state indicated by reference numeral B-3 is maintained.

The data transition when the modules A, B, and C are sequentially loaded has been described above in FIGS. 6A and 6B. Meanwhile, processing performed when the modules are unloaded is a data transition reverse to when the modules are loaded. For example, the state in which all the modules A, B, and C are loaded as indicated by reference numerals A-3 and B-3 is assumed. If the module C is unloaded in that state, the second management area 32 transitions from the state of reference numeral A-3 to the state of reference numeral A-2. At this time, the signal notification function list 10 transitions from the state of reference numeral B-3 to the state of reference numeral B-2.

Figure 7:
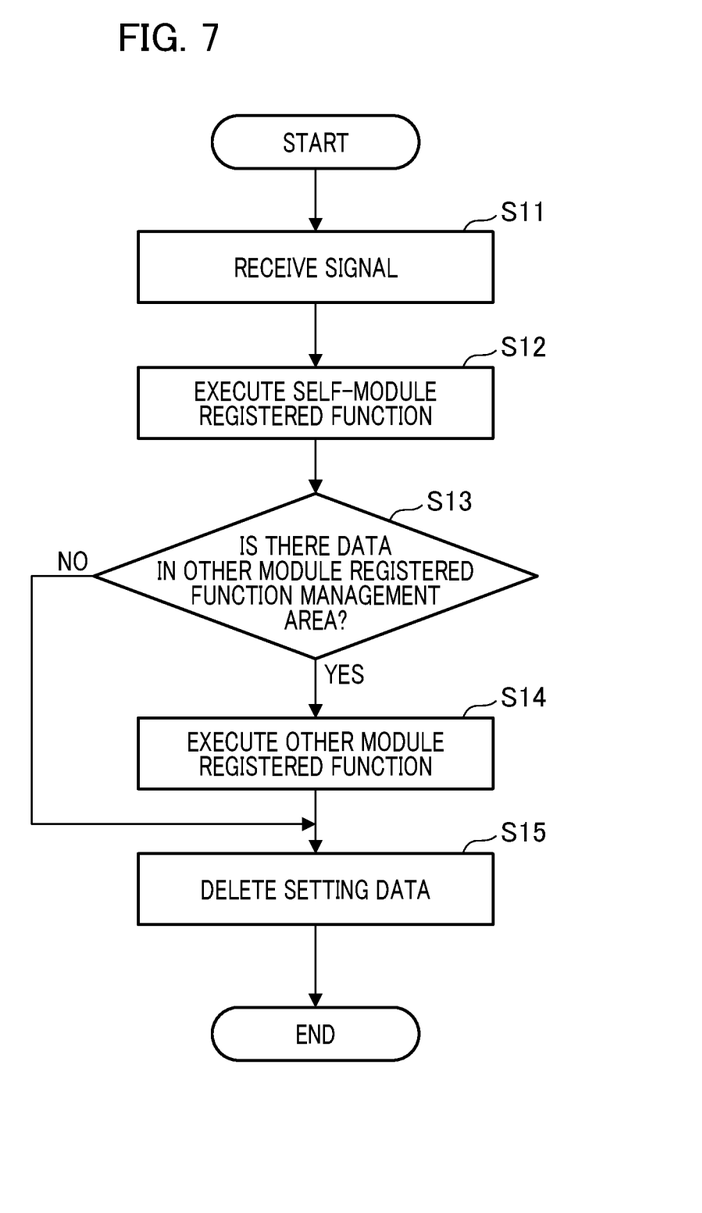
FIG. 7 is a flow chart showing an example of exception processing performed by the module management unit when an exception occurs in the first embodiment.

Next, exception processing of the present embodiment will be described with reference to FIG. 7. FIG. 7 is a flow chart showing an example of exception processing performed by the module management unit 7 when an exception occurs. The occurrence of the exception is detected by the runtime library 8 in the process 3. When the occurrence of the exception is detected, the OS 2 sequentially transmits a signal to functions registered in the signal notification function list 10. If a function of the module management unit 7 is registered in the signal notification function list 10, the module management unit 7 receives the signal transmitted by the OS 2 in S11. Next in S12, processing of the registered functions is executed. In the present embodiment, the function D defined by the module management unit 7 is called. The function D has the content of processing of sequentially calling the list of functions registered in the self-function management area 35. Thus, in the present embodiment, the function B and the function C are executed in that order as indicated by reference numeral A-3. After completion of S12, the module management unit 7 proceeds to the processing of S13, and determines whether a function is registered in the other function management area 36 in the setting data 9. If a function is registered in the other function management area 36, the module management unit proceeds to S14, and if no function is registered in the other function management area 36, the unit moves to S15.

In S14, the module management unit 7 calls the function registered in the other function management area 36. At this time, the same signal as the signal received in S11 is transmitted to the function. In the present embodiment, processing of the function A is executed as indicated by reference numeral A-3. Then, the module management unit proceeds to S15. In S15, processing of deleting the setting data 9 is performed. The processing of deleting the setting data 9 is performed to prevent data from remaining in a memory or remaining as a file after termination of the process 3. After the processing of S15, the runtime library 8 executes processing of terminating the process 3.

When a certain module is loaded in the process as described above, the module management unit 7 stores information of a function for which signal reception registration is performed in a storage area, and overwrites a function that is under management of the module management unit thereon. Accordingly, when an exception occurs in the process, calling of a function can be controlled, all functions can be notified of the same signal during the occurrence of the exception, and dump information at the time of an abnormal termination of the process can be acquired.

In the present embodiment, first type modules (self-modules) that are under management and a second type module (the other module) that is not under management are distinguished and managed. If the function of the second type module is registered in exception processing, processing of storing information of the function in a storage section is executed, and function registration to cause processing of the first type functions to be executed is performed, rather than for the aforementioned function. In the function registration, for example, a function of performing processing of calling the functions of the first type modules or the information of the functions of the first type modules is described in the list of functions.

In the present embodiment, the case in which there is only one module management unit in a process is exemplified to describe processing of the module management unit and the operation of data transition at the time of module loading and occurrence of an exception. When a module is loaded, the module management unit 7 monitors the signal notification function list 10 to determine whether the function of the other module is registered. When the function of the other module is registered in the signal notification function list 10, the function of the module management unit 7 is called when an exception occurs by replacing the function with a function for executing processing of the functions of its own modules. In addition, since information of the self-modules and the other module are managed by distinguishing the management areas thereof in the setting data 9, calling the function of the other module is possible after the functions of the self-modules are called. Accordingly, exception processing is possible not only in the self-modules but also in the other module.

(Second Embodiment)

Next, a configuration, a process, and the like of an information processing device of a second embodiment of the present invention will be described. In the present embodiment, a case in which there is a plurality of module management units in one process will be exemplified. It should be noted that, by using the reference numerals that are used above for the same constituent elements as those of the first embodiment, detailed description thereof will be omitted and differences will mainly be described. This manner of omitting description also applies to another embodiment to be described below.

Figure 8:
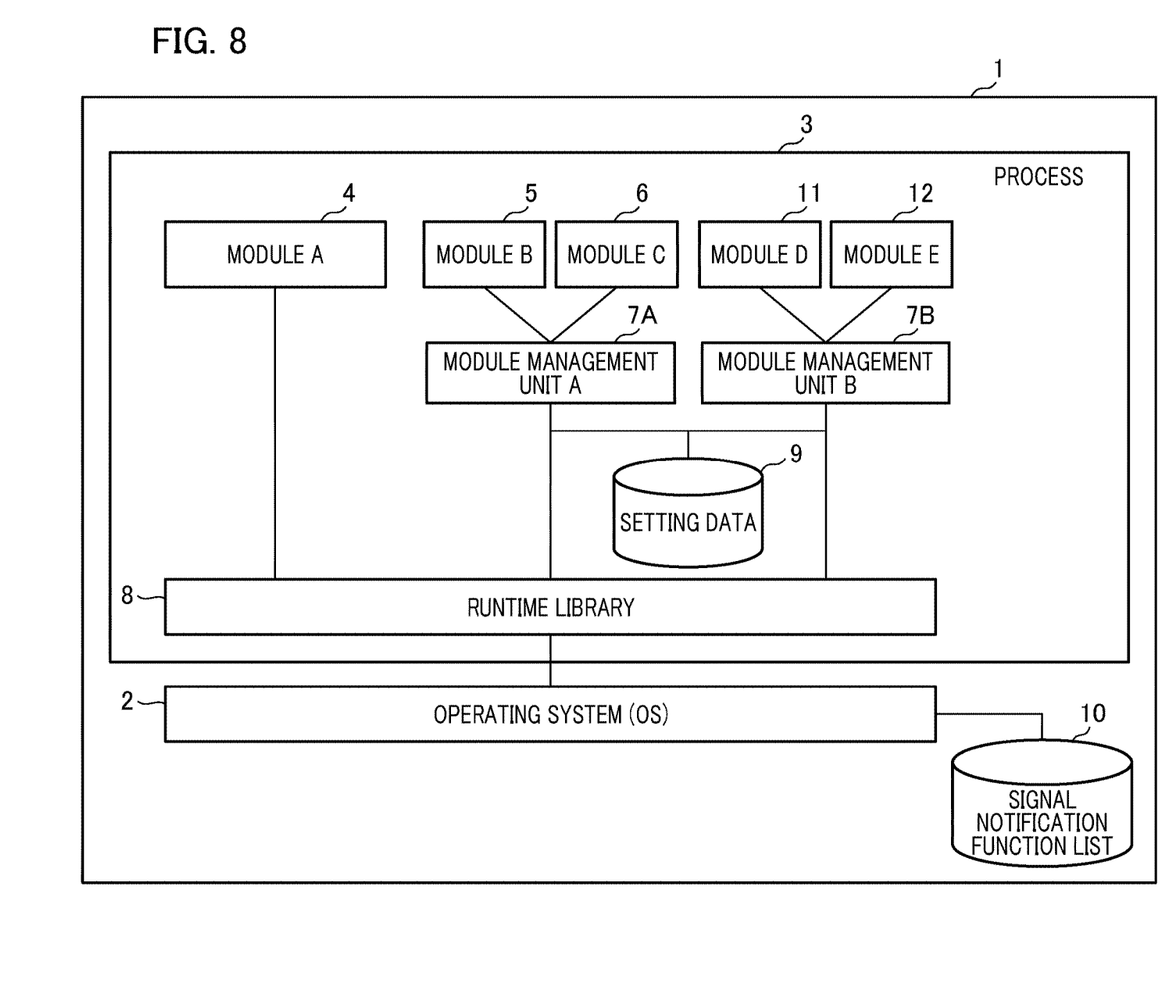
FIG. 8 is a block diagram showing a configuration example of an information processing device of a second embodiment.

FIG. 8 is a block diagram showing a configuration example of the information processing device of the present embodiment. A difference from the first embodiment is that the module management unit 7 in one process 3 exists as a plurality of instances. In FIG. 8, the module management unit 7A (module management unit A) and the module management unit 7B (module management unit B) are exemplified. It is assumed that the module management unit A manages a module B (module 5) and a module C (module 6), and the module management unit B manages a module D (module 11) and a module E (module 12). In addition, there is one instance of setting data 9 when there are the plurality of module management units in the one process 3. In the case of a method of managing the setting data 9 independently of each of the module management units, an order of calling the module groups managed by each of the module management units at the time of the occurrence of an exception is independent and thus it is not possible to control the order. For this reason, one set of the setting data 9 is configured to be shared by the plurality of module management units.

Since there is one set of the setting data 9 in the configuration of FIG. 8, when the module management unit B creates new setting data 9 even though the module management unit A is already running, for example, information that is included in the existing setting data 9 is lost. In this case, there is a possibility of some functions not being called when an exception occurs. In addition, when the module management unit B is unloaded, for example, if the setting data 9 is deleted even though the module management unit A is running, information included in the setting data 9 is lost. Thus, in the present embodiment, updating and deleting processing of the setting data 9 when there are the plurality of module management units 7 in the one process 3 will be described with reference to FIGS. 9 and 10.

Figure 9:
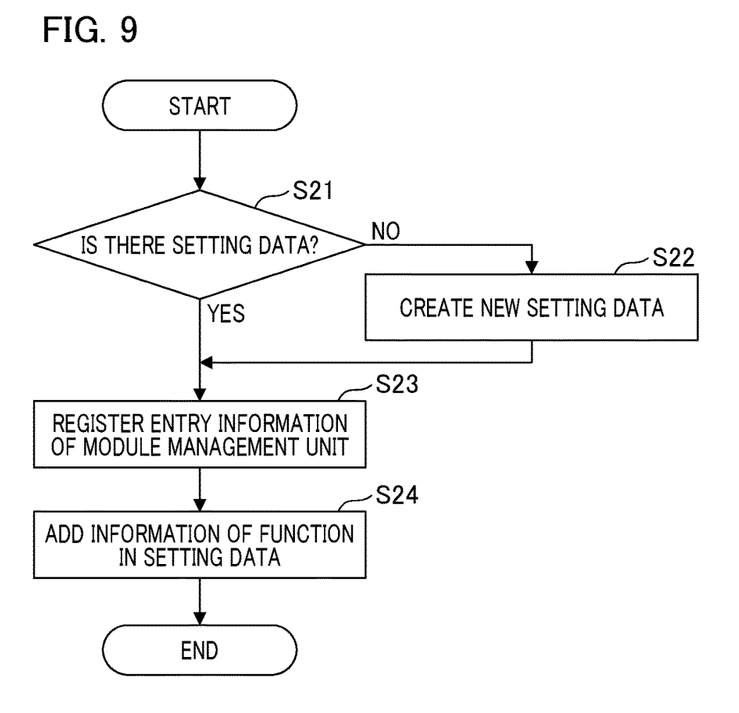
FIG. 9 is a flow chart showing an example of function information registration processing performed by a module management unit in the second embodiment.

FIG. 9 is a flow chart showing an example of function information registration processing performed by a module management unit 7. The processing shown in FIG. 9 relates to the processing of S1 of FIG. 5, and is executed by, for example, the module management unit 7A when a certain module is loaded in the process 3. First in S21, the module management unit 7A determines whether the setting data 9 already exists. The fact that the setting data 9 already exists refers to the fact that the other module management unit 7B is already loaded and the setting data 9 is created. Thus, if the setting data 9 already exists, the module management unit proceeds to S23 without creating new setting data 9. On the other hand, if there is no setting data 9, the module management unit 7A deems itself as a first loaded module management unit, and moves to S22. In S22, the first loaded module management unit 7A creates new setting data 9. Then, the module management unit proceeds to S23.

In S23, the module management unit 7A registers its own entry information in the setting data 9. Entry information refers to information regarding an instance of a module management unit that is loaded in the process 3. Such entry information is used to enable a first module management unit among a plurality of module management units to determine the presence of a second module management unit, in other words, whether a running second module management unit already exists. In addition, the entry information is also necessary as information for determining a module management unit that has registered a function in the self-function management area 35. As the entry information of a module management unit, for example, a module ID and a module name are registered in the setting data 9. Then, in S24, the module management unit 7A adds information of a function of which registration is requested from a self-module to the self-function management area 35 in the setting data 9. At this time, to identify a module management unit that has set the information, processing of imparting the entry information of the module management unit is performed.

Figure 10:
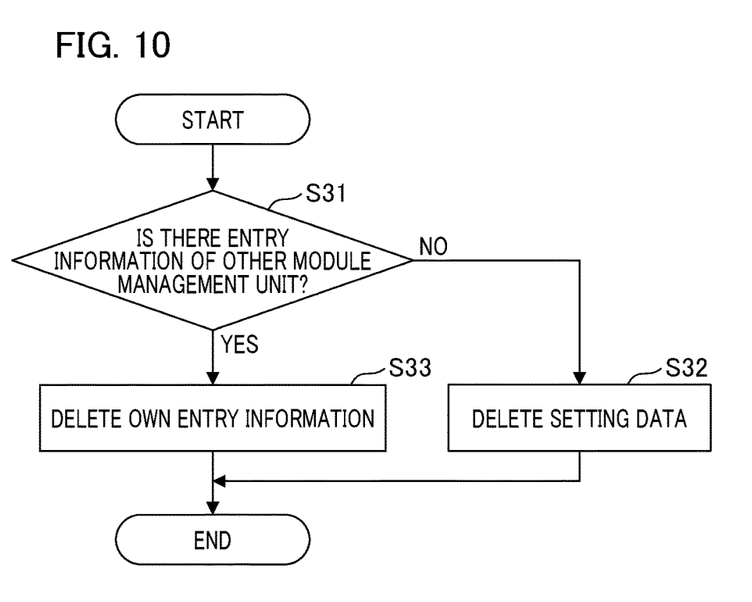
FIG. 10 is a flow chart showing an example of setting data deletion processing performed by the module management unit in the second embodiment.

Next, an example of processing of deleting the setting data 9 performed by a module management unit in the present embodiment will be described in FIG. 10. The processing shown in the flow chart of FIG. 10 relates to the processing of S15 of FIG. 7, and is executed by a module management unit 7 when an exception occurs in the process 3. First in S31, the module management unit 7A, for example, references entry information of the module management unit registered in the setting data 9. The module management unit 7A determines whether there is entry information of the other module management unit 7B in the setting data. That there is the entry information of the other module management unit 7B refers to a state in which the other module management unit 7B is still loaded. Thus, in this case, the module management unit 7A proceeds to S33 without deleting setting data. In S33, the module management unit 7A deletes its own entry information. On the other hand, if there is no entry information of the other module management unit 7B, there is no loaded module management unit other than the module management unit 7A. Thus, the module management unit 7A moves to S32 from S31, and deletes the entire setting data 9.

As described above, when there are the plurality of module management units in the same process and one set of the setting data 9 is referred to in the present embodiment, whether the other module management unit is running is determined. According to the result of the determination, processing of new creation, deletion, or the like of the setting data 9 is executed. According to the present embodiment, since there is no possibility of information of a registered function being lost due to overwriting or deletion of the setting data 9, exception processing can be appropriately executed.

(Third Embodiment)

Next, processing of an information processing device of a third embodiment will be described. In the first embodiment, the processing of calling a registered function when an exception occurs in the process has been described. Here, a case in which a function is to be called in a state in which a memory capacity is insufficient when an exception occurs is assumed as an example. In this case, if a stack overflow occurs when, e.g., calling of functions occurs an excessive number of times or the like, there is a possibility of a process being terminated without all the functions being called. In such a case, it is feared that it is not possible to acquire dump information of a more important module and only dump information of other modules is acquired. Thus, in the third embodiment, processing of sequentially calling functions having higher levels of importance when, for example, an information processing device such as a personal computer (PC) is in a difficult situation with respect to resources will be described.

Figure 11:
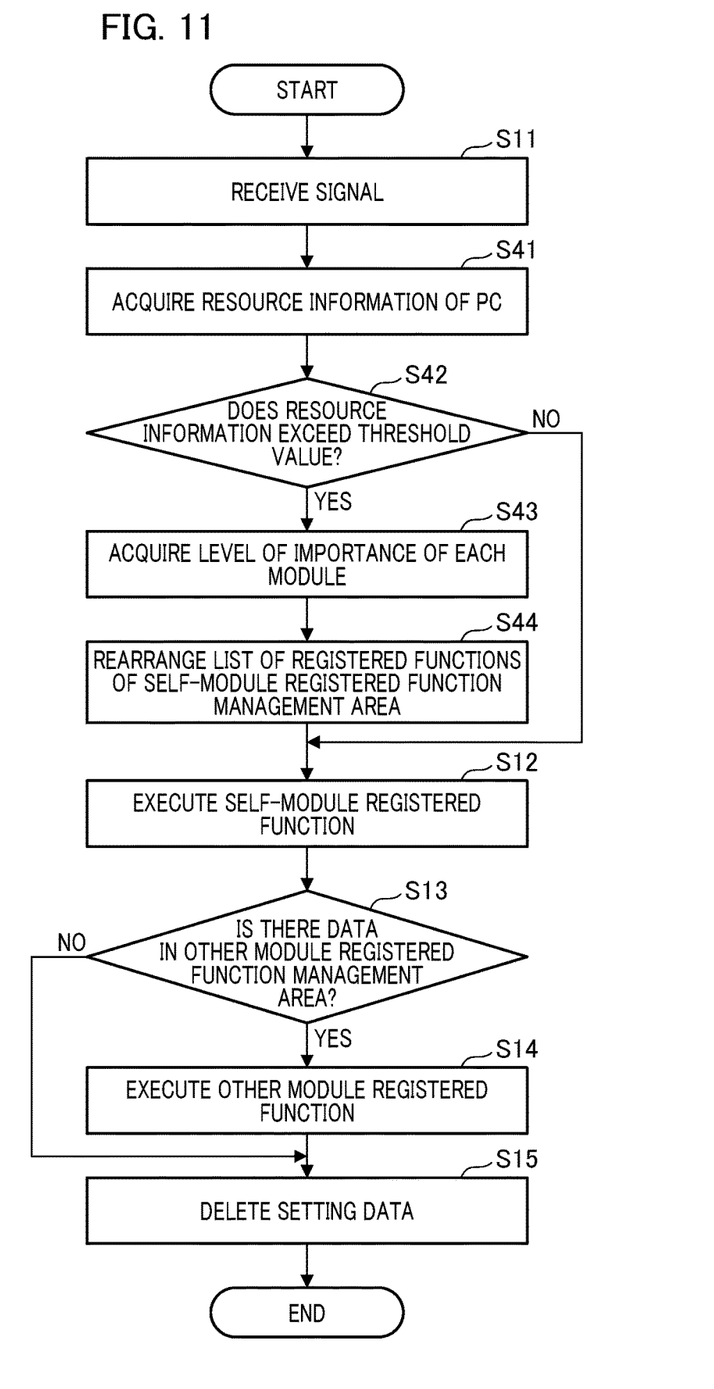
FIG. 11 is a flow chart showing an example of processing performed by a module management unit when an exception occurs in a third embodiment.

An example of processing performed by a module management unit 7 when an exception occurs in the present embodiment will be described with reference to the flow chart of FIG. 11. In FIG. 11, the processing shown in the steps from S11 to S15 are as described in FIG. 7 in the first embodiment. Thus, detailed description with regard to the steps from S11 to S15 will be omitted, and different processing from S41 to S44 will mainly be described.

First, when a runtime library 8 detects an exception, the OS 2 transmits a signal, and the module management unit 7 receives the signal in S11, and the processing proceeds to S41. In S41, the module management unit 7 acquires resource information of the information processing device 1. Resource information refers to a use rate of, for example, a CPU 21, a RAM 22, a hard disk 23, or the like. Next in S42, the module management unit 7 compares a value in the resource information acquired in S41 to a predetermined threshold value. This threshold value is set according to a resource situation in which all functions are not likely to be called. Methods of this setting include a method of setting a fixed value in advance and a method of setting a variable value that is dynamically decided according to the number of registered functions or the like. Processing of determining whether the value of the resource information exceeds the threshold value is performed in S42, and if the value exceeds the threshold value, the processing proceeds to S43, and if the value does not exceed the threshold value, the processing moves to S12.

In S43, the module management unit 7 acquires information of a level of importance of each module. Specifically, levels of importance are assumed to be set for modules, and the module management unit 7, for example, references the value indicating the level of importance of each module in this step. Then, in S44, the module management unit 7 updates setting data 9, and changes a calling order by rearranging the functions registered in a self-function management area 35 in a descending order of levels of importance. For example, if the levels of importance of modules increase as values indicating the levels of importance are higher, processing of sorting a list of functions is performed in a descending order of the values indicating the levels of importance. Then, the processing proceeds to S12 and succeeding steps. Since processing of functions is executed in the order of the list of functions in S12, the functions are sequentially called from one with the highest level of importance (i.e., priority).

In the present embodiment, by controlling an order of calling functions according to a situation of resources (such as a degree of difficulty, or a degree of sufficiency) of the information processing device when an exception occurs, information of a module having a higher level of importance can be preferentially acquired. Criteria for setting a level of importance include an order of modules having higher possibilities of a bug or an error occurring in the stage of development, and an order of modules having larger magnitudes. Thus, even if it is not possible to acquire complete dump information, it is possible to increase a possibility of acquisition of useful information for analyzing the cause of an exception.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-053658, filed Mar. 17, 2015, which is hereby incorporated by reference wherein in its entirety.

What is claimed is:

1. An information processing device comprising:
at least one processor coupled to a memory device and programmed to provide:
a registration unit configured to register a function of a module as a signal notification function that receives a signal if an exception occurs in a program; and
a determination unit configured to determine whether the function is already registered as the signal notification function;
wherein, if the registration unit registers a first function of a first module as the signal notification function, the determination unit determines whether a second function of a second module is already registered as the signal notification function, and if the determination unit determines that the second function is already registered as the signal notification function, the registration unit registers a third function for calling the first function and the second function as the signal notification function.

2. The information processing device according to claim 1,
wherein the registration unit performs management of modules by distinguishing the first module from the second module,
wherein the first module is a module under the management of the registration unit, and the second module is a module that is not under the management of the registration unit, and
wherein, if the determination unit determines that the second function is registered as the signal notification function, the registration unit stores information of the second function in a storage unit.

3. The information processing device according to claim 2, wherein the processor is further programmed to provide:
an execution unit configured to execute exception processing by transmitting the signal to a registered function when the exception occurs,
wherein, when the execution unit executes exception processing by transmitting the signal to the registered function, the registration unit transmits the function for calling the first function and the second function to the second function stored in the storage unit.

4. The information processing device according to claim 1, wherein, if the registration unit registers the first function as the signal notification function, the determination unit determines whether the first function is already registered as the signal notification function, and if the determination unit determines that the first function is not yet registered as the signal notification function, the registration unit registers the third function as the signal notification function.

5. The information processing device according to claim 1, wherein the registration unit performs processing of storing information of the first function in a first information management area and storing information of the second function in a second information management area.

6. The information processing device according to claim 1, wherein, if the registration unit registers the first function as the signal notification function, the determination unit determines whether the second function is already registered as the signal notification function, and if the determination unit determines that the second function is already registered as the signal notification function, the determination unit further determines whether the first function is already registered as the signal notification function, and the determination unit determines that the first function is not yet registered as the signal notification function, the registration unit performs processing of storing information of the already registered second function in a second information management area.

7. The information processing device according to claim 2, wherein the processor is further programmed to provide:
a plurality of registration units,
wherein the plurality of registration units share set information of the function called at the time of exception processing, create new set information if there is no set information, and register entry information of the registration unit in set information if there is the set information.

8. The information processing device according to claim 7, wherein, if there is entry information of a second registration unit in the set information, a first registration unit among the plurality of registration units does not delete the set information, but deletes entry information of the first registration unit that is in the set information.

9. The information processing device according to claim 2, wherein the registration unit acquires resource information of the information processing device, controls an order of functions to be called when the exception occurs according to the resource information, and changes the order of the functions to be called when the exception occurs into an order of priority of the modules.

10. A control method executed by an information processing device, the method comprising:
registering a function of a module as a signal notification function that receives a signal if an exception occurs in a program; and
determining whether the function is already registered as the signal notification function,
wherein, if a first function of a first module is registered as the signal notification function in the registering, whether a second function of a second module is already registered as the signal notification function is determined in the determining, and if the second function is determined to be already registered as the signal notification function in the determining, a third function for calling the first function and the second function is registered as the signal notification function.

11. The control method of an information processing device according to claim 10,
wherein the first module and the second module are distinguished and managed in the registering,
wherein the first module is a module under the management of the registering, and the second module is a module that is not under the management of the registering, and
wherein, if the second function is determined to be registered as the signal notification function in the determining, information of the second function is stored in a storage unit.

12. The control method of an information processing device according to claim 11, the method further comprising:
executing exception processing by transmitting the signal to a registered function when the exception occurs,
wherein, when exception processing is executed by transmitting the signal to the registered function in the executing, the function for calling the first function and the second function is transmitted to the second function stored in the storage unit in the registering.

13. The control method of an information processing device according to claim 10, wherein if the first function is registered as the signal notification function in the registering, whether the first function is already registered as the signal notification function is determined in the determining, and if the first function is determined to be not yet registered as the signal notification function in the determining, the third function is registered as the signal notification function.

14. The control method of an information processing device according to claim 10, wherein processing of storing information of the first function in a first information management area and storing information of the second function in a second information management area is performed in the registering.

15. The control method of an information processing device according to claim 10, wherein, if the first function is registered as the signal notification function in the registering, whether the second function is already registered as the signal notification function is determined in the determining, and if the second function is determined to be already registered as the signal notification function in the determining, whether the first function is already registered as the signal notification function is determined in the determining, and the first function is determined to be not yet registered as the signal notification function in the determining, processing of storing information of the already registered second function in a second information management area is performed.

16. The control method of an information processing device according to claim 11, wherein, if there are a plurality of registration units, in the registering, set information of the function called at the time of exception processing is shared, new set information is created if there is no set information, and if there is the set information, entry information of the registration units is registered in the set information.

17. The control method of an information processing device according to claim 16, wherein, in the registering, if there is entry information of a second registration unit in the set information, a first registration unit among the plurality of registration units does not delete the set information, but deletes entry information of the first registration unit that is in the set information.

18. The control method of an information processing device according to claim 11, wherein, in the registering, resource information of the information processing device is acquired, an order of functions to be called when the exception occurs is controlled according to the resource information, and the order of the functions to be called when the exception occurs is changed into an order of priority of the modules.

19. A non-transitory recording medium which stores a control program of an information processing device which causes a computer to perform each step of a control method for the information processing device, the method comprising:

registering a function of a module as a signal notification function that receives a signal if an exception occurs in a program; and
determining whether the function is already registered as the signal notification function,
wherein, if a first function of a first module is registered as the signal notification function in the registering, whether a second function of a second module is already registered as the signal notification function is determined in the determining, and if the second function is determined to be already registered as the signal notification function in the determining, a third function for calling the first function and the second function is registered as the signal notification function.

* * * * *